(12) United States Patent
Raisch (10) Patent No.: US 11,867,269 B2
(45) Date of Patent: Jan. 9, 2024

(54) SHIFT GROUP FOR POWER SHIFT TRANSMISSION

(71) Applicant: DEERE & COMPANY, Moline, IL (US)

(72) Inventor: Stefan Raisch, Vaihingen/Enz (DE)

(73) Assignee: Deere & Company, Moline, IL (US)

( * ) Notice: Subject to any disclaimer, the term of this patent is extended or adjusted under 35 U.S.C. 154(b) by 246 days.

(21) Appl. No.: 17/065,682

(22) Filed: Oct. 8, 2020

(65) Prior Publication Data

US 2021/0123513 A1    Apr. 29, 2021

(30) Foreign Application Priority Data

Oct. 23, 2019   (DE) .......................... 102019216299.1

(51) Int. Cl.
*F16H 37/08*   (2006.01)
*F16H 37/10*   (2006.01)

(52) U.S. Cl.
CPC ......... *F16H 37/0833* (2013.01); *F16H 37/10* (2013.01); *F16H 2200/0039* (2013.01); *F16H 2200/0086* (2013.01); *F16H 2200/201* (2013.01); *F16H 2200/2007* (2013.01); *F16H 2200/2041* (2013.01)

(58) Field of Classification Search
CPC .................. F16H 37/0833; F16H 37/10; F16H 2200/2007; F16H 2200/2041
See application file for complete search history.

(56) References Cited

U.S. PATENT DOCUMENTS

| | | | |
|---|---|---|---|
| 3,545,304 A | 12/1970 | Schmidt et al. | |
| 6,575,866 B2* | 6/2003 | Bowen | B60W 10/115 903/910 |
| 8,596,157 B2 | 12/2013 | Vu | |
| 9,879,761 B2 | 1/2018 | Vu | |
| 10,086,686 B2 | 10/2018 | Mueller et al. | |

(Continued)

FOREIGN PATENT DOCUMENTS

| | | |
|---|---|---|
| DE | 10260179 A1 | 7/2004 |
| DE | 102015211809 A1 | 12/2016 |

(Continued)

OTHER PUBLICATIONS

European Search Report issued in European Patent Application No. 20198073.7, dated Mar. 22, 2021, 15 pages.

*Primary Examiner* — Erin D Bishop
(74) *Attorney, Agent, or Firm* — Tucker Ellis LLP; Evan R. Sotiriou (57) ABSTRACT

A shift group for a power shift transmission includes a summation unit having a planetary stage and a branching coupling assigned to the planetary stage. The summation unit is designed such that a mechanical power is transmitted from a first shaft to a second shaft. A first power path and a second power path are provided. In a first shifting state, the power is transmitted via the first or the second power path, and in a second shifting state, the power is transmitted via both the first and the second power paths. The shift group also includes individually shiftable transmission units each comprising a different transmission ratio, where a first transmission unit is disposed in the first power path and a second and a third transmission unit are disposed in the second power path.

16 Claims, 7 Drawing Sheets

(56) References Cited

U.S. PATENT DOCUMENTS

| | | |
|---|---|---|
| 10,240,668 B2 | 3/2019 | Raisch |
| 10,352,401 B2 | 7/2019 | Raisch et al. |
| 10,539,207 B2 | 1/2020 | Raisch et al. |
| 11,187,310 B2 | 11/2021 | Eisenhardt et al. |
| 11,313,445 B2 | 4/2022 | Raisch |

FOREIGN PATENT DOCUMENTS

| | | | |
|---|---|---|---|
| EP | 1367296 B1 | 12/2011 | |
| EP | 3109509 A1 | 12/2016 | |
| EP | 3770465 A1 | 1/2021 | |
| WO | WO-2013159995 A1 * | 10/2013 | ............... B60K 6/48 |

* cited by examiner

| Gear | 45 | 65 | 75 | 55 |
|------|----|----|----|----|
| V1   | X  | X  |    |    |
| V2   | X  |    | X  |    |
| V3   | X  |    |    | X  |
| R1   |    | X  | X  |    |
| R2   |    | X  |    | X  |

| Gear | 45 | 85 | 75 | 55 |
|------|----|----|----|----|
| V1   |    | X  |    | X  |
| V2   | X  |    | X  |    |
| V3   | X  |    |    |    |
| R1   | X  | X  |    | X  |
| R2   |    |    | X  | X  |

FIG. 7

SHIFT GROUP FOR POWER SHIFT TRANSMISSION

RELATED APPLICATIONS

This application claims priority to German Application No. 102019216299.1, filed Oct. 23, 2019, the disclosure of which is hereby expressly incorporated by reference in its entirety.

FIELD OF THE DISCLOSURE

The present disclosure relates to a shift group for a power shift transmission having a summation unit which comprises a planetary stage and a branching coupling assigned to the planetary stage, wherein the summation unit is designed such that a mechanical power may be transmitted to a second shaft in a first shifting state of the branching coupling via a first or a second power path and in a second shifting state of the branching coupling both via the first and via the second power path.

BACKGROUND

Power shift transmissions are used in agricultural machines and serve for transmitting a mechanical power from a drive motor to a drive train. In this case it is crucial that the transmissions are designed such that they permit a high gear ratio spread, and at the same time have a low mass inertia to be synchronized. For this reason, such transmissions generally have a plurality of gears in order to be able to cover the high gear ratio spread. These individual gears are implemented by shifting individual shift groups relative to one another, wherein a first shift group is generally denoted as a gear shift group and a second shift group is denoted as a range shift group. Each of these shift groups has a specific number of shiftable gears, wherein the total number of gears is produced by multiplying the gears from both shift groups.

In principle, shift groups of the type described above are known from the prior art, wherein for the person skilled in the art it is always desired, on the one hand, to increase the number of gears so that it is possible to configure the transitions relative to the transmission ratios between the individual gears to be as smooth as possible within the gear ratio spread and, on the other hand, to reduce the number of components and structural units required therefor. This not only leads to a cost saving. Due to the smaller number of components, the required constructional space for the power shift transmission may also be significantly reduced. Due to the smaller number of components, the susceptibility to error or the maintenance effort are also reduced.

Thus, there is a need for a shift group which includes a small number of components and a high number of gears.

SUMMARY

According to the present disclosure, individually shiftable transmission units which differ from one another relative to their transmission ratio are provided, respectively one thereof in the first power path and two thereof in the second path. In this case, it is particularly advantageous if the ratio of the transmission units in the second power path to the first power path is 2:1.

The transmission units are individually shiftable via one respective power path, so that in the case of three transmission units a total of three different gears are formed. By combining in each case two transmission units in one respective power path, two further possible gears are produced, so that five gears are able to be produced with a total of three transmission units. Since each of the transmission units is individually shiftable via one respectively assigned coupling, the shift group in such an embodiment has a total of four couplings in addition to the branching coupling. In contrast to an embodiment in the form of a conventional spur gear group, therefore, by combining two power paths one coupling may be dispensed with.

The term "summation unit" within the scope of the present disclosure means a combination of a planetary stage and a branching coupling, by which it is possible to divide the power flowing into the shift group into two power paths. This is possible by planetary stages generally having three inputs or outputs which may be combined together and which may be individually connected to shafts. A conventional embodiment consists of a combination of a sun gear, a plurality of planetary gears which circulate around the sun gear and which are connected together via a common planet carrier, and a ring gear which in turn adjoins the planet carrier. The summation unit in this case may be already arranged on the power input or even on the power output.

An embodiment in which not only the summation unit has a planetary stage but also at least one of the transmission units is configured as a planetary stage is particularly advantageous. Accordingly, the power may be divided via one of the planetary stages and combined together again via the other planetary stage, wherein in each case one of the planetary stages is connected to the first shaft and the respective other planetary stage is connected to the second shaft.

In an embodiment with respectively two planetary stages, according to a first alternative the first shaft may be connected to the at least one transmission unit which is configured as a planetary stage and the second shaft may be connected to the summation unit. According to a second embodiment, the second shaft may be connected to the at least one transmission unit which is configured as a planetary stage and the first shaft may be connected to the summation unit.

As already described above, planetary stages generally consist of a combination of a sun gear, a planet carrier and a ring gear. If at least one of the transmission units is configured as a planetary stage an embodiment has also proved particularly advantageous, however, in which two planet carriers arranged coaxially to one another are provided, wherein the planets of the first planet carrier are in engagement with the planets of the second planet carrier and wherein the planet carriers are coupled together. This is a planetary stage in which two groups of planets are arranged in succession in the radial direction, whereby a reversal of the rotational direction may be produced in a simple manner. For example, it is possible that not all of the transmission units produce a rotational direction of the second shaft in the same rotational direction. Instead, a reversal of the rotational direction may be obtained, for example, by one of the transmission units, whereby reverse gears are also possible by a direct connection.

Relative to the planetary stage of the summation unit, an embodiment has proved advantageous in which the summation unit comprises two planetary units which are arranged adjacent to one another and which in each case comprise a sun gear and a planet carrier circulating around the sun gear, wherein the planetary units differ from one another regarding the transmission ratio thereof and the planet carriers are connected together. Such an embodiment is particularly expedient when the summation unit is arranged on the power input, wherein in a first shifting state the planet carrier is directly connected to the first shaft and the second shaft is connected to one of the sun gears.

In principle, all of the transmission units within the scope of the present disclosure may be configured as a planetary stage. Alternatively, however, at least one of the transmission units is configured as a spur gear stage in the first or second power path. Therefore, this spur gear stage has two spur gear sets with in each case a drive gear and an output gear, wherein the output gear of the first spur gear set is connected via an auxiliary shaft to the drive gear of the second spur gear set. Both spur gear sets in each case have a specific transmission ratio, wherein the total transmission ratio of the spur gear stage is produced by multiplying the transmission ratio of the first and second spur gear set.

According to a development of the present disclosure, at least one of the transmission units is configured as a direct transmission in the first or in the second power path. "Direct transmission" means within the scope of the present disclosure that the transmission unit forms a transmission ratio of i=1, so that the first and the second shaft have the same rotational speed. In principle, therefore, it is sufficient if this transmission unit simply consists of one coupling which permits a direct or indirect coupling of the two shafts together. However, the power may nevertheless also be transferred via components of individual transmission units which thus also transmit the power directly.

So that each of the transmission units is individually shiftable, each transmission unit comprises one respective transmission coupling or is configured as a transmission coupling. A multiplate clutch is suitable, in particular, as a type of coupling since this multiplate may be actuated even at different rotational speeds of the elements to be coupled together, and produces a synchronization of the rotational speeds by a frictional connection.

As already described above, the transmission units in the first and in the second power path, when connected individually and thus not combined together, may produce a rotation of the shaft in a first rotational direction. Alternatively, however, it is also possible that individual transmission units produce an opposing rotation in a second rotational direction. Irrespective of the specific embodiment, however, it is particularly advantageous if individual gears produce a reversal of the rotational direction, so that both a forward and a reverse operation is possible. Particularly, the shift group has three forward gears and two reverse gears. To this end, two variants have proved particularly advantageous.

According to a first variant, all of the transmission units are configured in the first and the second power path such that in the first shifting state of the branching coupling they produce a rotation of the second shaft in a first rotational direction, wherein the power paths may be combined together in the second shifting state such that the second shaft has a rotation in a second rotational direction which opposes the first rotational direction. Accordingly, a reverse operation is only possible by combining the two power paths. This may be brought about, for example, via a planetary stage with a ring gear, wherein in such a case the summation unit forms the planetary stage which combines the two power paths.

Alternatively, at least two transmission units are configured in the second power path such that in the first shifting state of the branching coupling the transmission units produce an opposing rotational direction of the second shaft. Thus, at least one gear provided for reverse travel may be directly shifted, wherein the transmission ratios of the individual transmission units are configured such that even when combining the two power paths together, an additional forward and an additional reverse gear are configured so that a total of three forward and two reverse gears are also provided here.

In principle, the number of transmission units may also be increased. Particularly, however, exactly one more transmission unit is always arranged in the second power path compared to the first power path.

A further subject of the present disclosure is a transmission, in particular a power shift transmission with a shift group according to the present disclosure, wherein the summation unit is arranged in the power flow upstream or downstream of the transmission units.

The transmission has at least one further shift group which is arranged upstream or downstream of the shift group according to the present disclosure.

A further subject of the present disclosure is a method for shifting the shift group, wherein the branching coupling for a first shifting state is closed and one of the transmission units from the first and the second power path is connected and wherein the branching coupling for a second shifting state is opened and in each case one of the transmission units from the first and the second power path is connected.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
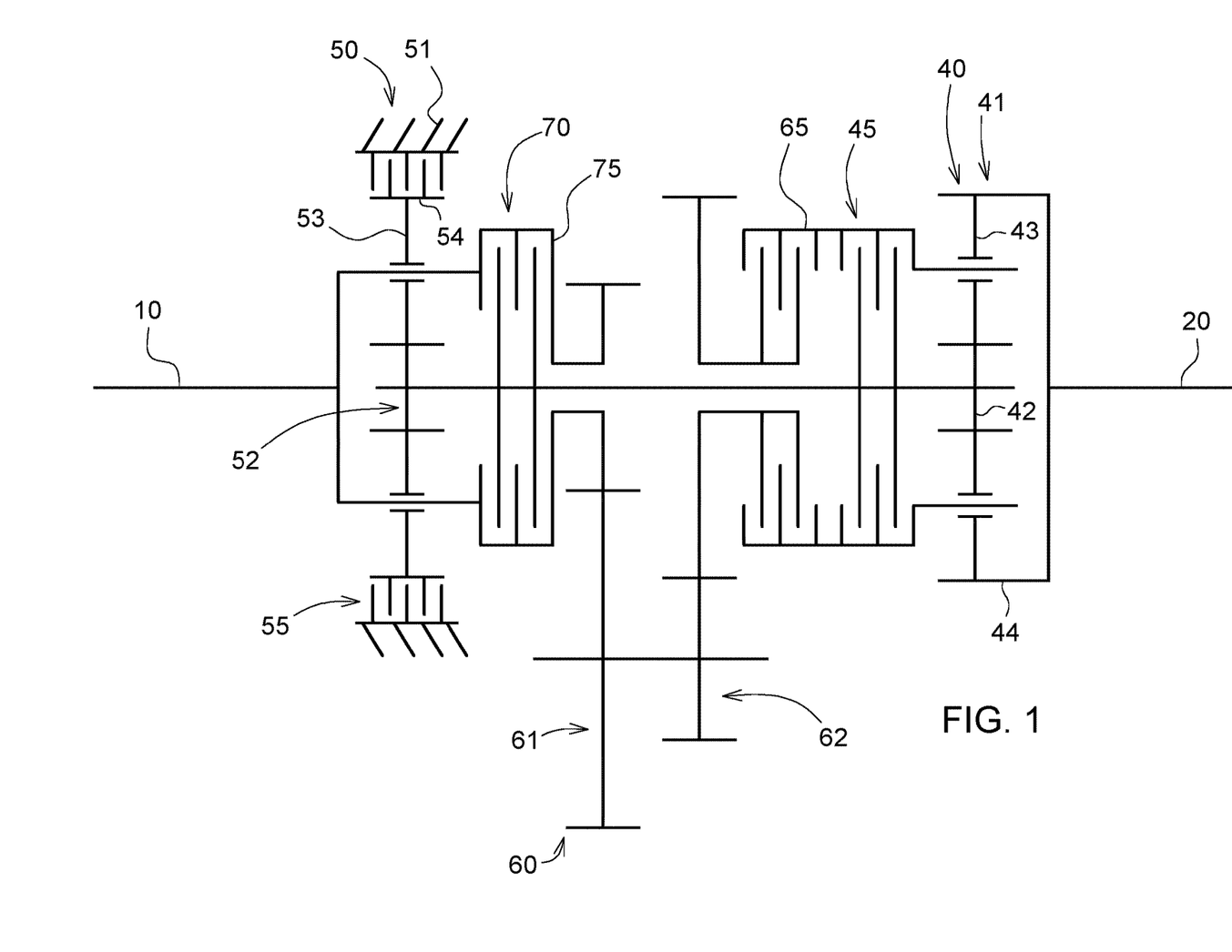
FIG. 1 shows the shift group according to a first embodiment.

FIG. 1 shows the shift group according to the present disclosure according to a first variant. The power is introduced via a first shaft 10 into the shift group and transmitted via the shift group to a second shaft 20. The shift group has a summation unit 40 which consists of a planetary stage 41 and a branching coupling 45. In the variant according to FIG. 1, the summation unit 40 is arranged at the end in the power flow and directly adjoins the second shaft 20. The planetary stage 41 of the summation unit 40 has a sun gear 42, a planet carrier 43, with a plurality of planets circulating around the sun gear, and a ring gear 44 which is directly connected to the second shaft 20.

A transmission unit 50, which is also configured as a planetary stage and which similar to the summation unit 40 has a sun gear 52, a planet carrier 53 and a ring gear 54, adjoins the first shaft 10. The planet carrier 53 is directly connected to the first shaft 10. The ring gear 54 may be blocked relative to a housing 51 via a transmission coupling 55 which is configured as a ring gear brake.

The power is branched via the transmission unit 50 to a first and a second power path I, II, wherein the summation unit 40 combines the two power paths I, II again and transmits the power to the second shaft 20.

Only one transmission unit 60 which is configured as a spur gear set is provided in the first power path I. This transmission unit 60 directly adjoins the first shaft 10 via the planet carrier of a third transmission unit 70 and the planet carrier 53 of the first transmission unit 50 and is driven irrespective of the position of the individual transmission couplings 55, 65, 75, provided the first shaft 10 is set in rotation. The spur gear stage consists of two individual spur gear sets 61, 62, the rotation being transmitted thereby to the transmission coupling 65. This transmission coupling in turn directly adjoins the planet carrier 43 of the summation unit 40.

By closing the branching coupling 45 it is brought about that both the sun gear 42 and the planet carrier 43 of the planetary stage 41 of the summation unit 40 have the same rotational speed. This also means that the ring gear 44 and thus also the second shaft 20 have the same rotational speed, which are predetermined via the spur gear set of the transmission unit 60.

If, when the branching coupling 45 is closed, only the transmission coupling 75 is closed, the sun gear 52 and the planet carrier 53 of the transmission unit 50 are blocked relative to one another so that both shafts 10, 20 have the same rotational speed. Accordingly, the shifting of the transmission unit 70 represents a direct gear.

A further shifting state may be achieved by the transmission coupling 55 being closed instead of the transmission couplings 65, 75, whereby the ring gear 54 is blocked relative to the housing 51. Both the transmission unit 50 and the transmission unit 70 in this case are arranged in the second power path II and thus in an open state of the branching coupling 45 may be combined with the transmission unit 60 which is configured as a spur gear set.

Figure 2:
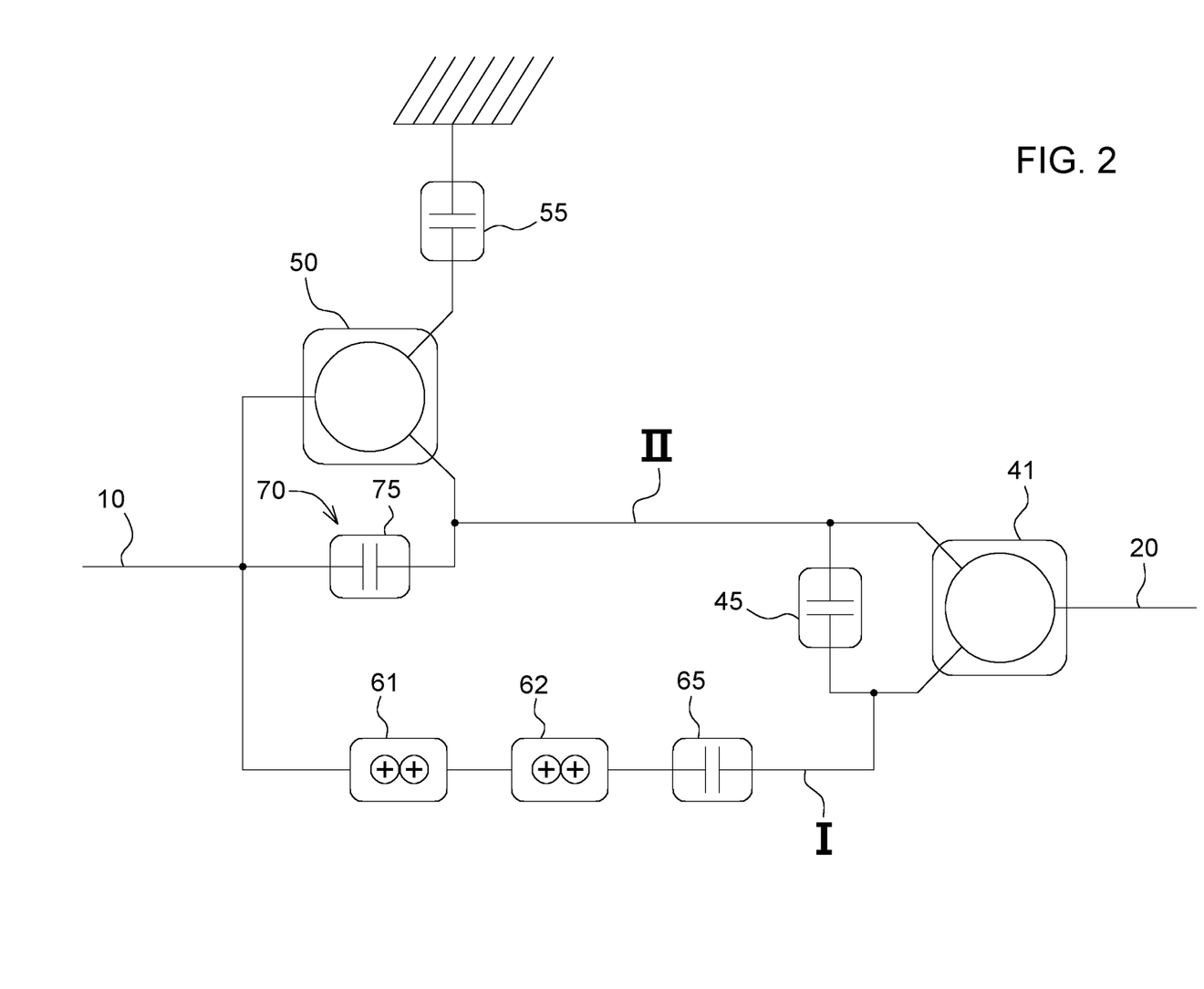
FIG. 2 shows the shift group according to FIG. 1 in a power flow diagram.

This shifting principle is revealed more clearly in FIG. 2. FIG. 2 shows how power may be transmitted from the first shaft 10 to the second shaft 20, wherein the transmission couplings 55, 75 or the transmission units 50, 70 are arranged in a second power path II and the spur gear sets 61, 62 or the transmission coupling 65 are arranged in the first power path I. If the branching coupling 45 is opened, the two power paths I, II may be combined together in the planetary stage 41. If the branching coupling 45 is closed, only one transmission unit 50, 60, 70 may be used in each case from one of the two power paths I, II in order to transmit the power to the second shaft 20. As already described above, the summation unit 40 is arranged with the planetary stage 41 and the branching coupling 45 in the power flow downstream of the transmission units 50, 60 70.

Figure 3:
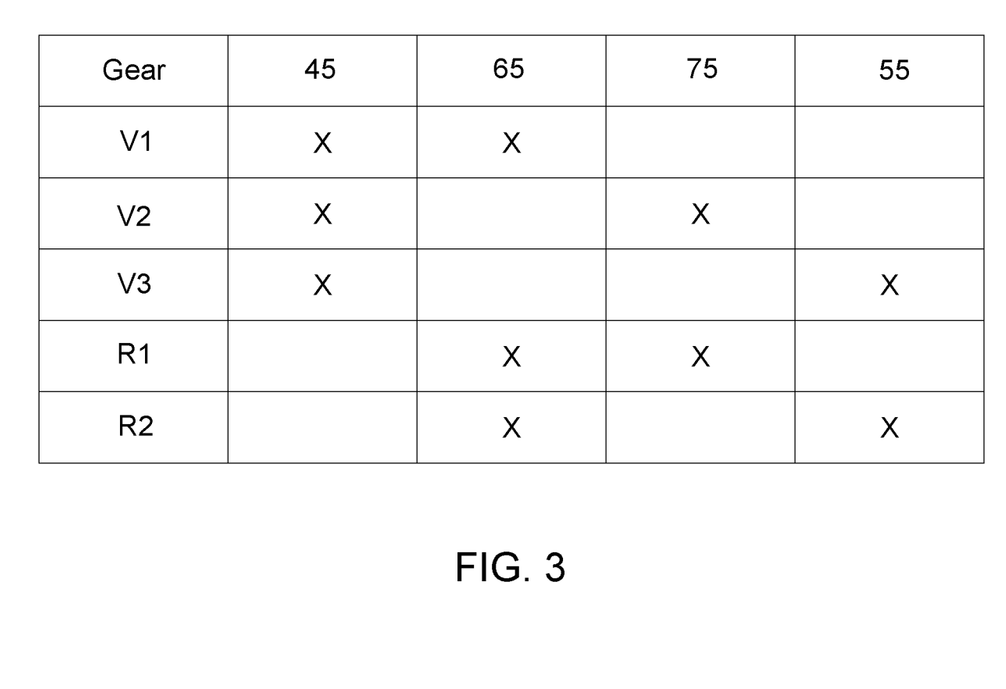
FIG. 3 shows a shift matrix for a shift group according to FIG. 1.

FIG. 3 shows a shift matrix of the shift group according to FIGS. 1 and 2. A total of three forward gears V1, V2, V3 and two reverse gears R1, R2 are provided, the forward gears being formed by individual shifting of the individual transmission couplings 55, 65, 75, so that the branching coupling 45 and one respective transmission coupling 55, 65, 75 are closed. In this case, initially the transmission coupling 65 is closed, then the transmission coupling 75 is closed and only then is the transmission coupling 55 closed.

The reverse gears R1, R2 are obtained by combining the power paths I, II together, wherein the transmission unit 60 is combined with one of the transmission units 50, 70. As a result, the branching coupling 45 is opened and the transmission coupling 65 and one of the transmission couplings 55, 75 are closed.

Figure 4:
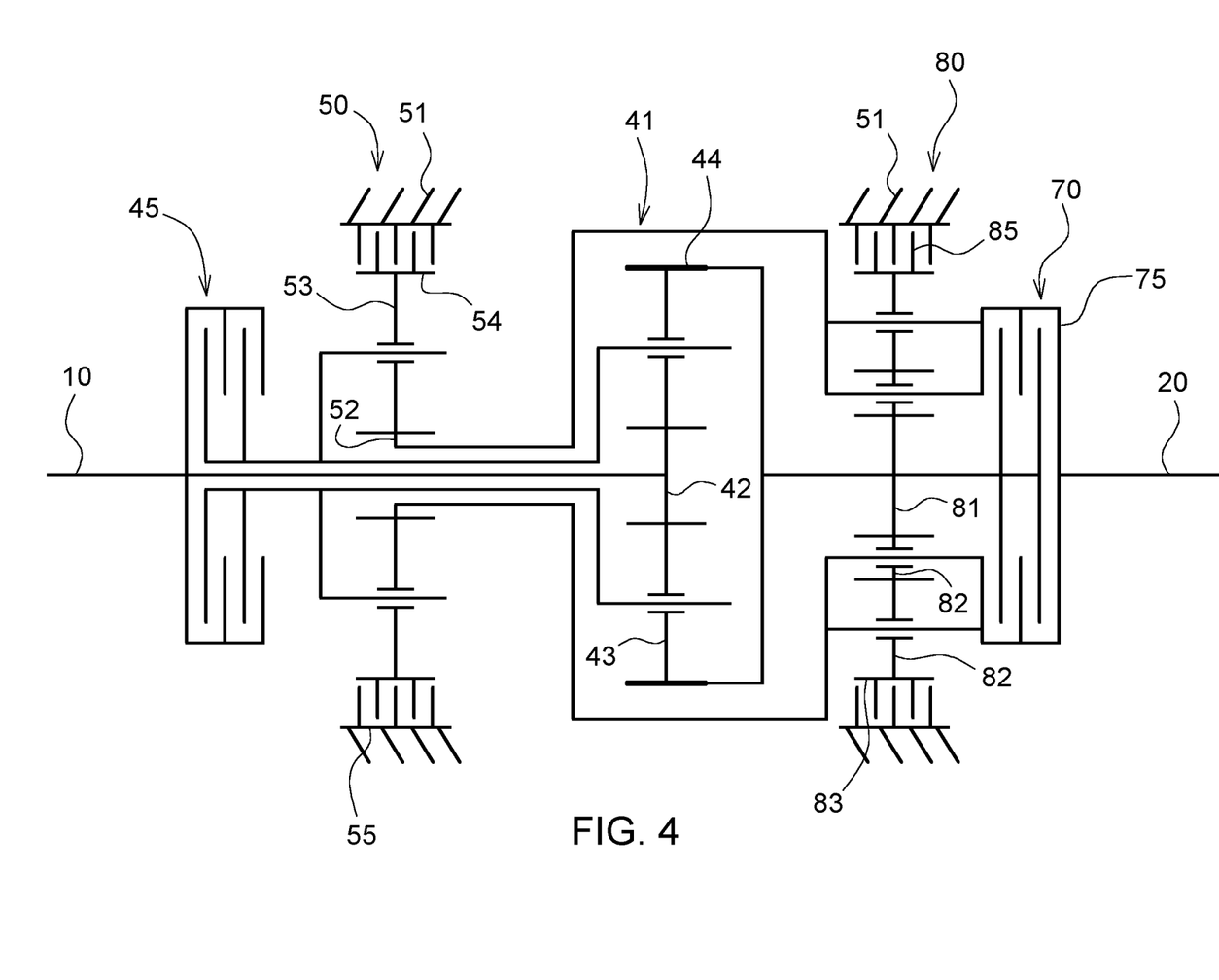
FIG. 4 shows a shift group according to a second variant.

FIG. 4 shows the shift group according to the present disclosure according to a second variant, in which in contrast to the version shown in FIG. 1 the summation unit 40 is now arranged on the power input and thus directly adjoins the first shaft 10. To this end, the inner planet carrier of the planetary gear coupling 45 is directly connected to the sun gear 42 of the planetary stage 41 and the outer planet carrier is directly connected to the planet carrier 43 of the planetary stage 41, so that accordingly the two power paths I, II may be formed via the sun gear 42 and the planet carrier 43. The arrangement of the summation unit 40 in the power input is shown, in particular, very clearly by comparing the view with FIG. 6, wherein from the structural perspective, the planetary stage 41 is arranged between the transmission unit 50 and the transmission unit 80. In a similar manner to the first variant the transmission unit 70 is also configured here as a direct gear. In contrast thereto, the transmission units 50, 80 are both designed as planetary stages. To this end the transmission unit 50 has a sun gear 52, a planet carrier 53 and a ring gear 54, wherein the ring gear 54 may be fixed relative to the housing 51 via a transmission coupling 55 which is configured as a ring gear brake. The planet carrier 53 is also directly connected to the inner planet carrier of the branching coupling 45 and thus at the same time also directly to the planet carrier 43 of the planetary stage 41.

The transmission unit 80 also has a sun gear 81 and a ring gear 83 which is able to be fixed relative to the housing 51 in a similar manner to the transmission unit 50 by a transmission coupling 85 which is configured as a ring gear brake. However, this results in the particularity that the transmission unit 80 has two planet carriers 82 which are arranged coaxially to one another and connected together. Moreover, the planet carriers are directly connected to the sun gear 52 of the transmission unit 50. By the two planet carriers 82 it is achieved that the transmission unit 80 in an individually connected shifting state forms a reverse gear or produces a reversal of the rotational direction of the second shaft 20. This second shaft 20 is directly connected to the planet carrier 82. Moreover, a coupling to the sun gear 81 may be implemented by coupling-in the transmission coupling 75 of the transmission unit 70.

In this connection FIG. 6 illustrates once again which transmission units 50, 70, 80 are arranged in the power paths I, II. Accordingly, the transmission unit 50 is arranged in the first power path I and the transmission units 70, 80 are arranged in the second power path II. This power flow diagram also similarly applies to a third variant according to FIG. 5.

Figure 5:
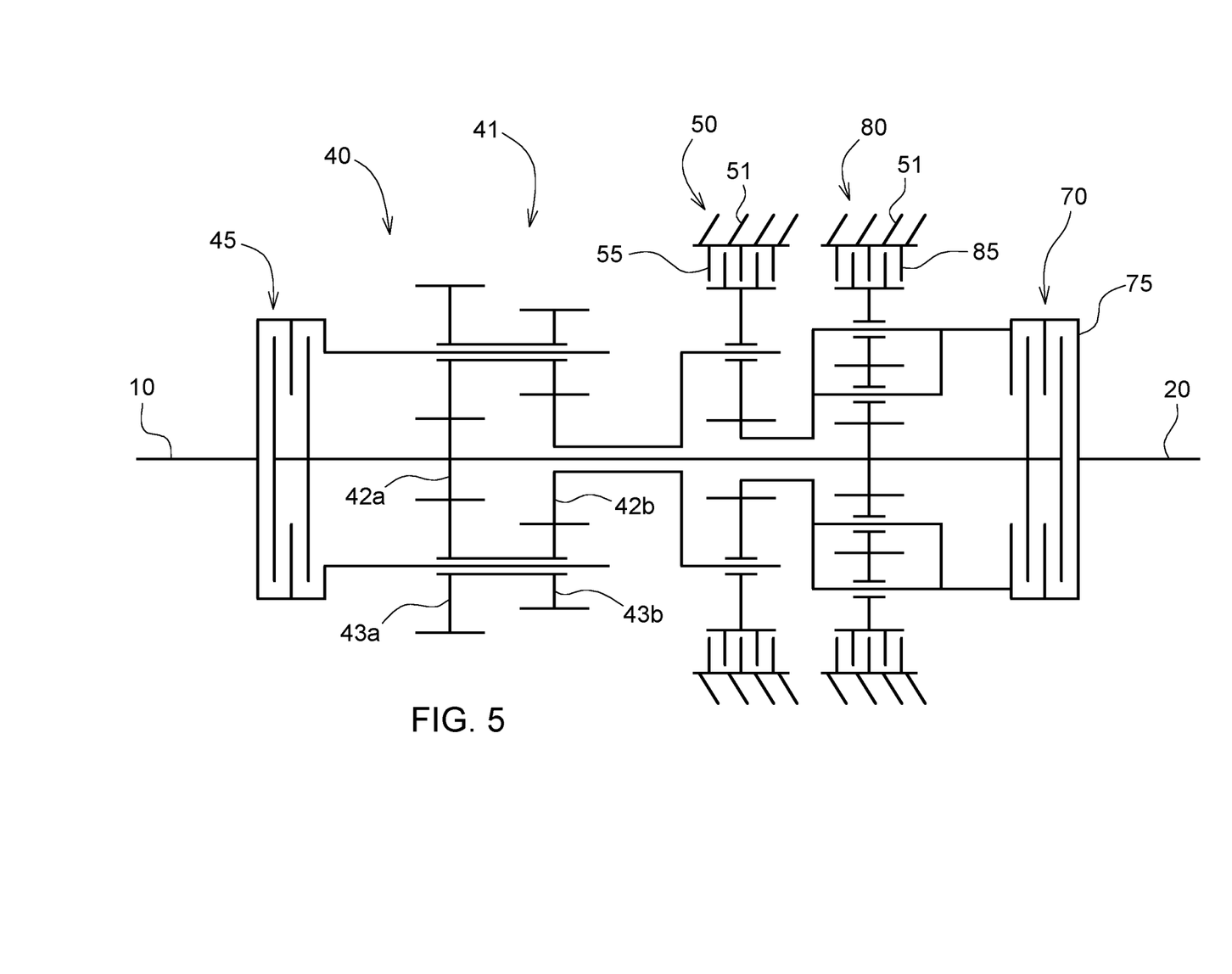
FIG. 5 shows a shift group according to a third variant.
Figure 6:
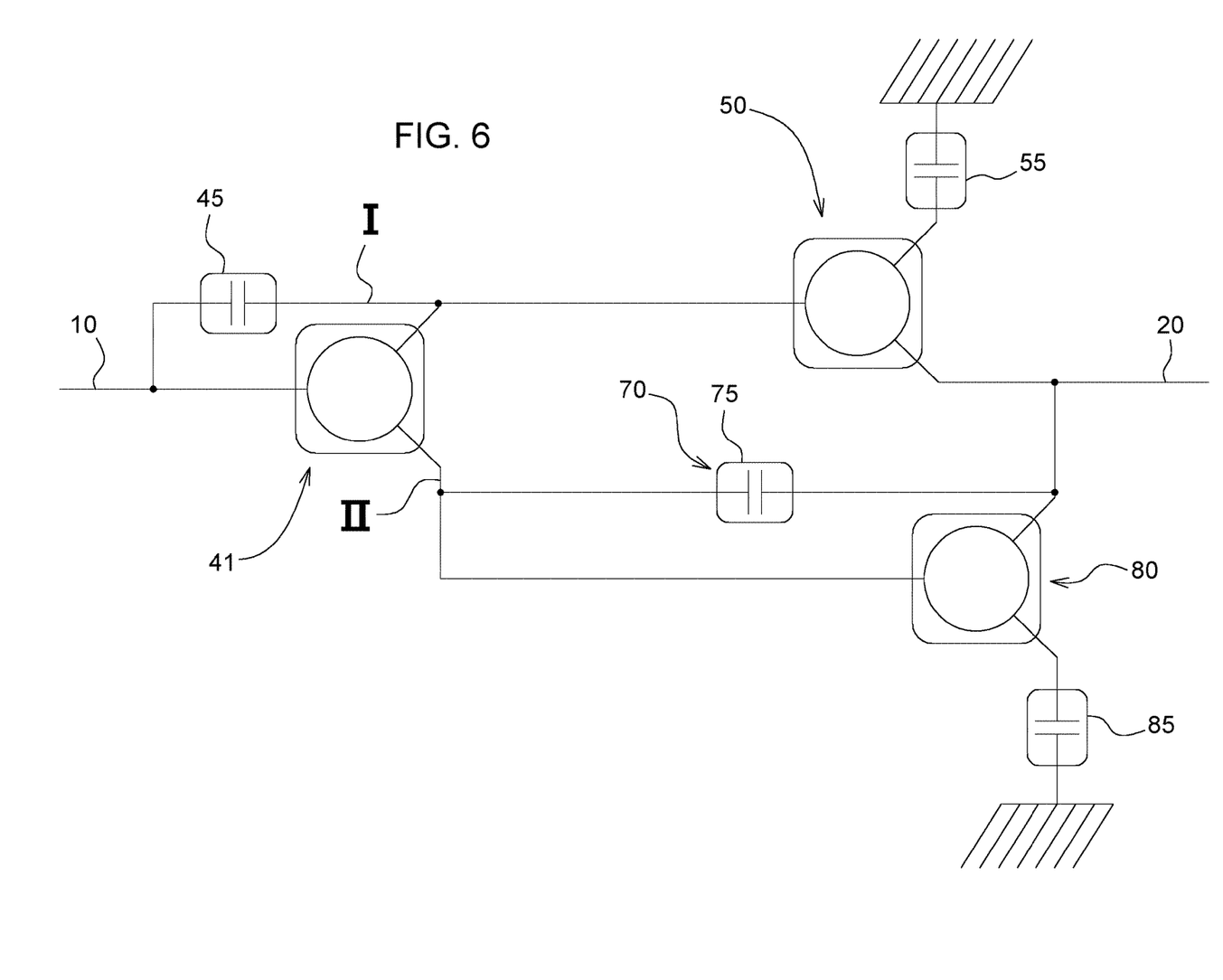
FIG. 6 shows a power flow diagram for the shift groups according to FIGS. 4 and 5.

In this case, the shift groups of the two FIGS. 5 and 6 differ substantially by the specific design of the summation unit 40. Instead of a ring gear, this summation unit now has two planetary stages 41 which are arranged adjacent to one another and which in each case have a sun gear 42a, 42b and a planet carrier 43a, 43b. The two planet carriers 43a, 43b are directly connected together and to the outer planet carrier of the branching coupling 45, which in turn adjoins the first shaft 10. As a result, a rotation of the first shaft 10 produces a rotation of the planet carrier 43a, 43b. The first sun gear 42a also adjoins the inner planet carrier of the summation unit 40 so that when coupled-in the sun gear 42a also has the same rotational speed as the first shaft 10. The power outputs of the summation unit 40 are formed via the first sun gear 42a and via the second sun gear 42b, wherein these power outputs are designed in a similar manner to the variant according to FIG. 4.

Figure 7:
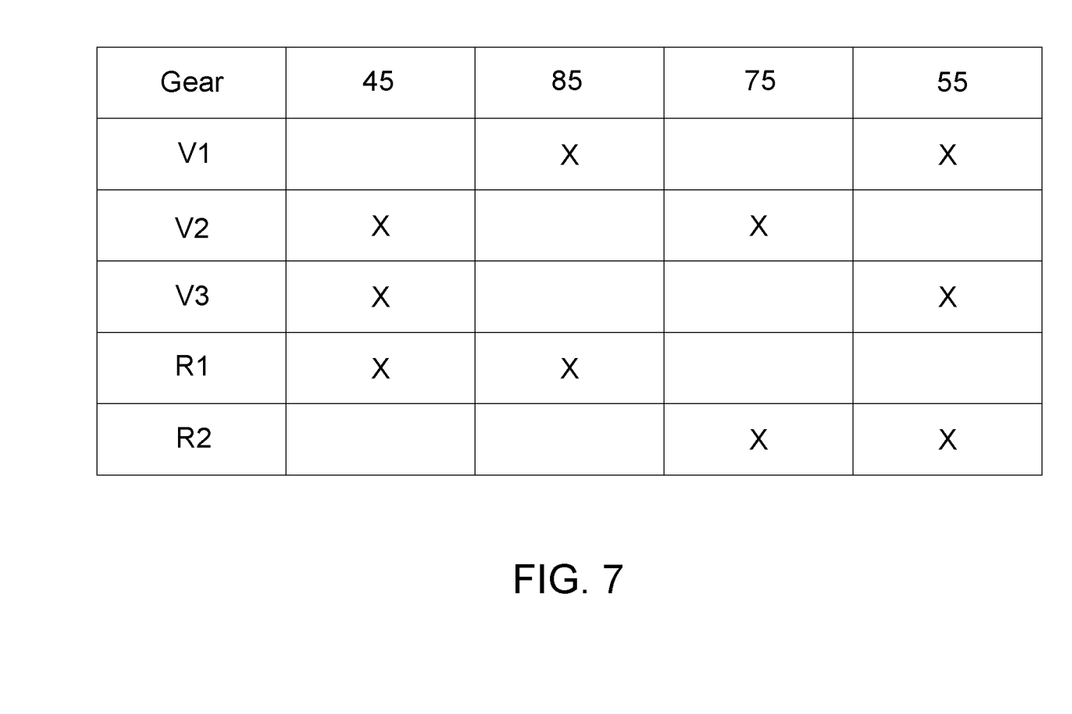
FIG. 7 shows a shift matrix for the shift groups according to FIGS. 4 and 6.

FIG. 7 shows the shift matrix for the shift groups according to FIGS. 4 to 6. Accordingly, two forward gears V2, V3 may now be directly achieved by connecting the branching coupling 45 and the planetary gear couplings 75, 55. Additionally, a directly shiftable reverse gear R1 is available by connecting the transmission coupling 85.

If the two power paths I, II are combined together, a further forward gear V1 and a further reverse gear R2 may be obtained, wherein the branching coupling 45 is opened. By combining the transmission couplings 55, 85, the forward gear V1 is shifted and by combining the transmission units 70, 50 the reverse gear R2 is shifted.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A shift group for a power shift transmission, comprising:
   a summation unit including a first planetary stage and a branching coupling assigned to the planetary stage, the summation unit designed such that a mechanical power is transmitted from a first shaft to a second shaft, wherein the first and second shafts are arranged coaxially to one another;
   a first power path and a second power path, where in a first shifting state, the power is transmitted via the first or the second power path, and in a second shifting state, the power is transmitted via both the first and the second power paths; and
   individually shiftable transmission units each comprising a different transmission ratio, where a first transmission unit is disposed in the first power path and a second and a third transmission unit are disposed in the second power path;
   wherein one of the second transmission unit and the third transmission unit includes a second planetary stage;
   wherein the first transmission unit is directly coupled to the first shaft;
   wherein the summation unit is directly coupled to the second shaft; and
   wherein the first transmission unit includes a first transmission coupling, the second transmission unit includes a second transmission coupling, and the third transmission unit includes a third transmission coupling.

2. The shift group of claim 1, wherein the first shaft is connected to the second planetary stage and the second shaft is connected to the summation unit.

3. The shift group of claim 1, wherein the second shaft is connected to the second planetary stage and the first shaft is connected to the summation unit.

4. The shift group of claim 1, wherein the second planetary stage comprises a first planet carrier and a second planet carrier arranged coaxially relative to one another, each of the first and second planet carriers comprising planets, wherein the planets of the first planet carrier are in engagement with the planets of the second planet carrier.

5. The shift group of claim 4, wherein the planet carriers of the first and second planet carriers are coupled together.

6. The shift group of claim 1, wherein the planetary stage of the summation unit comprises two planetary units arranged adjacent to one another.

7. The shift group of claim 6, wherein each of the two planetary units comprise a sun gear and a planet carrier circulating around the sun gear;
   wherein the planetary units comprise different transmission ratios and the planet carriers are connected together.

8. The shift group of claim 1, wherein the first transmission unit comprises a spur gear stage in the first power path.

9. The shift group of claim 8, wherein the spur gear stage comprises two spur gear sets, wherein an output spur gear of one spur gear set is coupled to a drive gear of another spur gear set.

10. The shift group of claim 1, wherein at least one transmission unit comprises a direct transmission in the first or second power path.

11. The shift group of claim 1, wherein in the first shifting state, the second shaft rotates in a first rotational direction, and in the second shifting state, the second shaft rotates in a second rotational direction which opposes the first rotational direction.

12. The shift group of claim 1,
    wherein in the first shifting state, the transmission units produce opposing rotational directions of the second shaft.

13. The shift group of claim 1, wherein the summation unit is arranged in a power flow upstream of the transmission units.

14. The shift group of claim 1, wherein the summation unit is arranged in a power flow downstream of the transmission units.

15. The shift group of claim 14, wherein the summation unit is arranged at an end of the power flow.

16. A transmission comprising the shift group of claim 1.

* * * * *